United States Patent [19]

Lundgren

[11] 4,205,707
[45] Jun. 3, 1980

[54] PIPE PROTECTOR

[75] Inventor: Robert S. Lundgren, Anaheim, Calif.

[73] Assignee: Hydril Company, Los Angeles, Calif.

[21] Appl. No.: 967,991

[22] Filed: Dec. 11, 1978

[51] Int. Cl.² ............................................. F16L 21/02
[52] U.S. Cl. .................................. 138/89; 138/96 R;
138/96 T; 405/255
[58] Field of Search ..................... 138/89, 96 R, 96 T;
215/329, 275; 308/4 A, 4 R; 220/320; 174/192;
405/255; 16/108; D9/254; D23/41

[56] References Cited
U.S. PATENT DOCUMENTS

| 1,786,491 | 12/1930 | Hunter | 138/96 T |
|---|---|---|---|
| 2,156,221 | 4/1939 | Kahn et al. | 138/96 T |
| 2,253,729 | 8/1941 | Schuetz | 138/96 T |
| 2,316,013 | 4/1943 | Mulholland | 138/96 T |
| 2,709,456 | 5/1955 | Hillix | 138/96 T |
| 2,808,954 | 10/1957 | Smith | 215/275 |
| 3,606,073 | 9/1971 | Burke | 138/96 T X |
| 3,713,463 | 1/1973 | Bywater | 138/89 |
| 3,814,135 | 6/1974 | Hetzer et al. | 138/96 T X |
| 4,020,873 | 5/1977 | Palarino | 138/96 T |
| 4,079,756 | 3/1978 | Smiley | 215/275 X |
| 4,111,235 | 9/1978 | Gray | 138/89 X |

Primary Examiner—Richard E. Aegerter
Assistant Examiner—James E. Bryant, III
Attorney, Agent, or Firm—William W. Haefliger

[57] ABSTRACT

A pipe or rod protector includes structure to interfit the pipe or rod end, such structure including an end cap and a split ring tightenable to retain the structure on the pipe or rod end.

15 Claims, 5 Drawing Figures

PIPE PROTECTOR

BACKGROUND OF THE INVENTION

This invention relates generally to pipe or rod end protection, and more particularly concerns the provision of protectors easily applicable to and removable from such ends, as for example externally or internally threaded pipe ends.

The threaded ends of heavy steel pipe or casing, as for example is used in wells, require protection from physical damage as during transit and during dragging of pipe on the ground; also, it is very desirable to prevent ingress of corrosive or other fluids into the pipe interior via the pipe ends. These needs also exist for pipe used in other applications, as well as for rod ends. Insofar as I am aware, no prior protector possessed the unusual combinations of structure, function and results as are now enabled or provided by the present protector, to meet such needs.

SUMMARY OF THE INVENTION

It is a major object of the invention to provide a protector which is readily applicable to and removable from a pipe or rod end, especially a pipe end, and whether the pipe is externally or internally threaded; which cannot be removed from the pipe or rod end except by predetermined release of a connector; which protects against ingress of fluid into the pipe end; and which is of simple rugged and durable construction as will appear. Basically, the protector comprises:

(a) structure sized to telescopically interfit the pipe or rod end portion, (b) such structure including a cap to extend across the end of the pipe or rod, (c) the structure also including a C-shaped split ring sized for telescopic reception on said end portion, the ring having a radially compressible body portion, (d) and connector means associated with the split ring or tightening the ring to exert force acting to retain such structure to the pipe or rod end.

As will be seen, the cap may have a head to extend across the pipe or rod end, and a skirt telescopically interfitting the ring to be retained to the pipe or rod end by the ring; the skirt and ring may consist of elastomeric material to be compressively clamped together, with the skirt compressively clamped to the pipe end portion, as for example to an external thread or to the outer surface of the end portion which is internally threaded; the skirt establishes a seal against the pipe surface to prevent ingress of fluid into the pipe despite the fact that the outer ring is split; and the skirt and ring may be reinforced by metallic inserts which contribute to the protective qualities of the devices.

These and other objects and advantages of the invention, as well as the details of an illustrative embodiment, will be more fully understood from the following description and drawings, in which:

DRAWING DESCRIPTION

DETAILED DESCRIPTION

Figure 1:
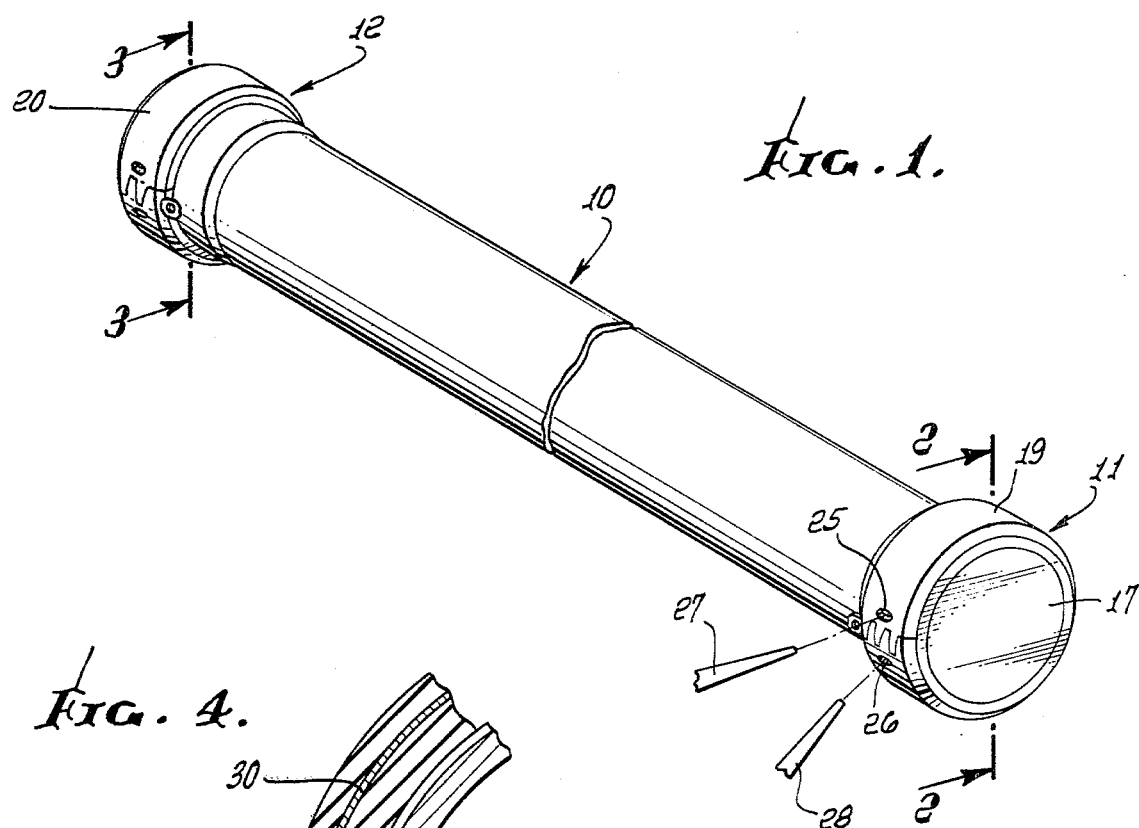
FIG. 1 is a perspective view of a pipe on which protectors embodying the invention are carried.
Figure 4:
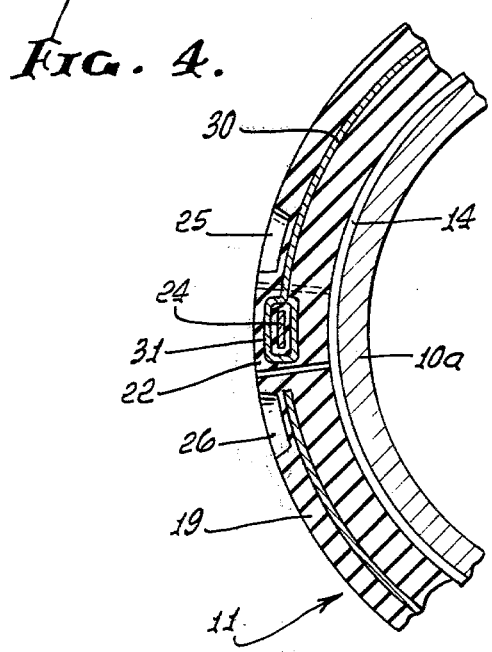
FIG. 4 is an enlarged section taken on lines 4—4 of FIG. 2.

In the drawings, the protectors at opposite ends of the pipe 10 are designated at 11 and 12. The pipe is representative of rod or pipe members which may, for example have threads at one or both ends thereof. The description will be directed to one example of well pipe with threads at both ends, FIG. 2 showing a pipe pin end portion with two-step external threads 13 and 14, and FIG. 3 showing a pipe box end portion with two-step internal threads 15 and 16.

Each protector 11 and 12 may be considered to embody structure sized to telescopically interfit the pipe (or rod) member end portion, such structure including a cap to extend across the end of the member. In FIG. 2 the cap is designated generally at 17 and in FIG. 3 it is shown at 18. Also, the structure of each protector 11 and 12 includes a C-shaped split ring sized for telescopic reception on the pipe end portion, the ring having a radially compressible body portion. In FIG. 2 the ring is designated generally at 19 and in FIG. 3 it appears at 20.

Figure 5:
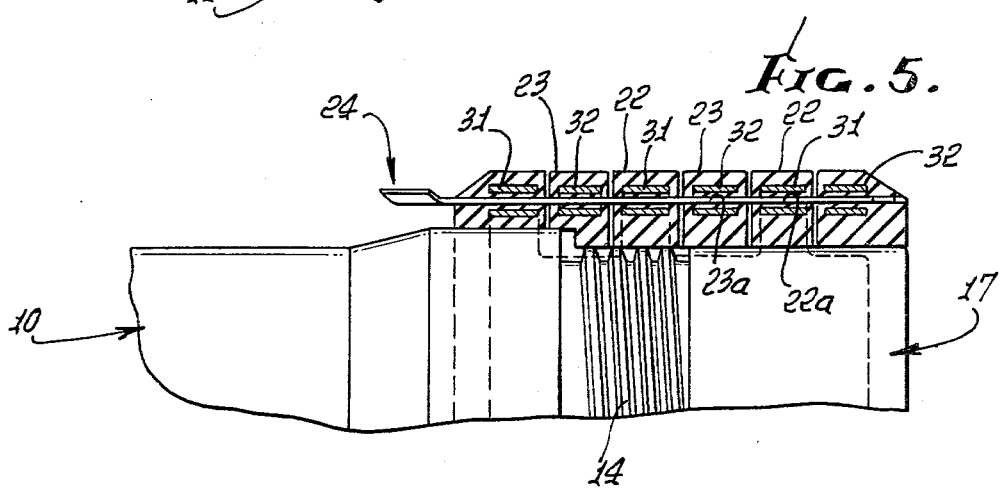
FIG. 5 is an enlarged section taken on lines 5—5 of FIG. 2.
Figure 2:
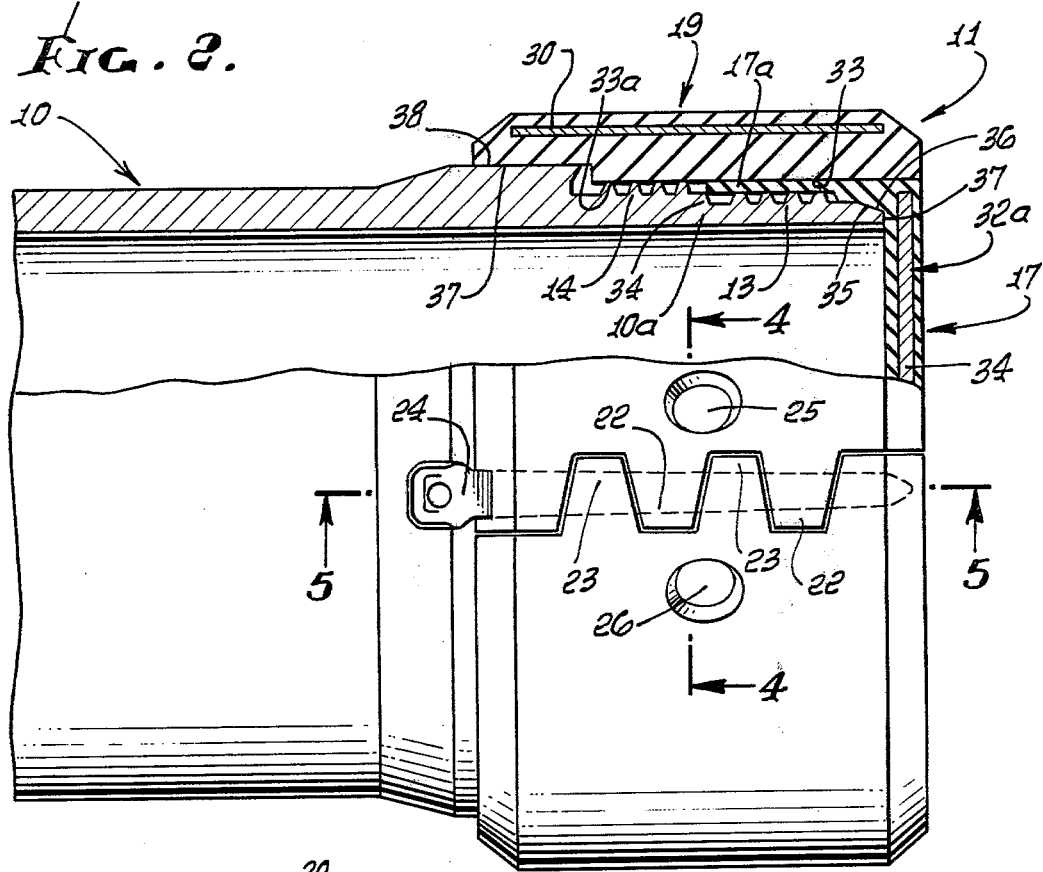
FIG. 2 is an enlarged view of one protector, partly in section on lines 2—2 of FIG. 1.
Figure 3:
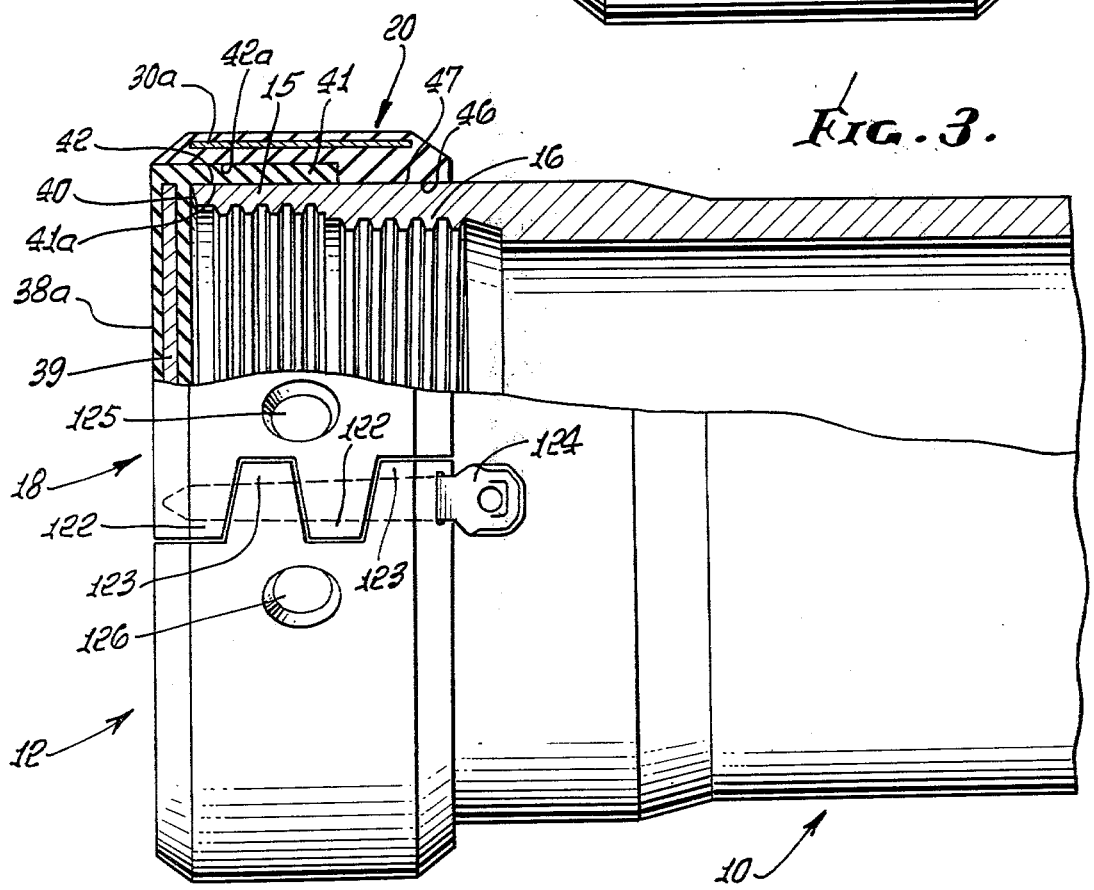
FIG. 3 is an enlarged view of another protector, partly in section on lines 3—3 of FIG. 1.

In each of FIGS. 2 and 3, connector means is associated with the protector to exert force acting to retain the overall structure to the pipe end portion. Thus, for example, the split ring 19 has terminals adapted to be drawn together in interfitting relation for retention after application of the ring about the pipe pin end portion 10a and about the cap skirt 17a. In this regard, the terminals may be defined by first and second groups of staggered teeth 22 and 23 formed by the ring material, which is typically elastomeric. Such teeth have longitudinal openings 22a and 23a therein adapted to be brought into alignment to receive a retainer pin 24 upon coupling of the protector ring 19 about the pipe end and about the cap skirt 17a. Such alignment may be effected by manipulation of tongs, the jaws 27 and 28 of which (as seen in FIG. 1) are receivable into openings 25 and 26 formed in the ring, near the teeth. Corresponding elements 122–126 appear in FIG. 3. A C-shaped, flexible metallic reinforcement band 30 is molded into the elastomeric ring 19, and has loop shaped, opposite end terminals molded in the teeth 22 and 23. FIG. 5 shows such terminals at 31 and 32 respectively at opposite ends of the band 30. Retainer pin 24 is closely received in and through the loop-shaped metallic terminals. A similar refinforcment band is shown at 30a in FIG. 3, and is understood to have corresponding loop shaped terminals in teeth 122 and 123 to receive retainer pin 124.

Referring now specifically to FIG. 2, the cap 17 is shown to include as elastomeric head 32a that extends across the open end of the pipe, the head molded integrally with the skirt 17a. The latter telescopically interfits the ring bore 33, to be retained to the pipe end portion by the ring. A metallic plate 34 is molded into the head 32, and its periphery extends in alignment with the pipe end portion. Cylindrical skirt 17a protectively overlaps the thread 13 of lesser diameter, and may advantageously extend to the shoulder 34 between threads 13 and 14. A bore portion 35 of the skirt is sized to compressively engage an outer surface defined by the pipe or rod end. That surface is typically a frusto-conical land 36 which is radially compressively engaged by bore portion 35 to form a seal preventing ingress of exterior corrosive or other fluid or liquid into the pipe.

For that purpose, land 36 is located between the threading on the pipe and the end 37 of the latter. The existence of that seal enables the ring 19 to be fully split, in an axial direction, as illustrated in FIG. 2, whereby fluid entering the thread via the split cannot gain ingress to the pipe interior.

It will also be noted that the ring 19 has a bore 37 which compressively engages the pipe or rod exterior surface, as at 38, at a location axially spaced from the skirt, further, the ring bore at 33a may also compressively engage thread 14. These points of engagement of the ring with the pipe, thread and skirt assure a frictional retention of the ring on the pipe end portion, preventing dislodgement of the ring and cap off the pipe as during dragging of the pipe on a surface, for example during up-lifting of the pipe at a derrick location, with the ring dragging on the deck.

The protector 12 at the opposite end of the pipe also functions to prevent ingress of external fluid into that pipe end, so as to prevent pipe bore corrosion. As shown in FIG. 3, the cap 18 has an elastomeric head 38a extending across the pipe end. Also, a reinforcement metal plate 39 is molded into the head, as shown, and its periphery extends in alignment with the pipe end 40. The cap elastomeric skirt 41 has a bore 41a closely fitting, and compressed against the outer surface 42 of the pipe end portion shown, and forms a seal therewith. The skirt is received in counterbore 42a defined by the ring 20, so that tightening of the split ring effects the compressive seal between the cap skirt and the pipe outer surface. The ring also consists of elastomeric material. Such material for the described rings and caps may consist of rubber having a shore hardness between 75 and 80.

The ring 20 also has a bore at 46 compressively engaging the pipe surface 47, whereby tightening of the ring on the pipe and on the cap skirt develops friction sufficient to prevent dislodgement of the protector 12 off the end of the pipe as the protector is dragged on the ground or on a deck.

Removal of the protectors off the ends of the pipe is effected by removing pins 24 and 124, which relieves tensioning of the rings 19 and 20, which in turn allows their removal off the pipe ends along with removal of the caps 17 and 18.

Note that the rings and caps also cushion sudden impact loads delivered to the pipe ends and threads.

I claim:

1. In a protector for a pipe or rod end portion, the combination comprising
   (a) structure sized to telescopically interfit the pipe or rod end portion,
   (b) said structure including a cap to extend across the end of the pipe or rod,
   (c) said structure also including a C-shaped elastomeric split ring sized for telescopic reception on said end portion, the ring having a radially compressible body portion,
   (d) and connector means associated with the split ring for tightening the ring to exert force acting to retain said structure to the pipe or rod end,
   (e) said cap having a head to extend across the end of the pipe or rod, and a skirt telescopically interfitting said ring to be retained to the pipe end portion by said ring, the skirt consisting of compressible elastomeric material and having a bore portion sized to compressively engage an outer surface defined by the pipe or rod end in response to clamping of the skirt by the ring.

2. The combination of claim 1 including said pipe or rod end having said end portion interfitting said structure, with said structure retained on said end portion by said split ring.

3. The combination of claim 2 wherein said end portion includes threading protectively overlapped by said structure.

4. The protector of claim 1 wherein said body portion defines a bore receiving a portion of said cap skirt.

5. The combination of claim 4 including said pipe or rod end having threading thereon, the threading protectively overlapped by said skirt and by said ring.

6. The combination of claim 1 wherein the cap has an elastomeric head, and a metallic plate confined in said head, the plate having a periphery to extend substantially in alignment with the radially outer extent of said end of the pipe or rod.

7. The combination of claim 1 including a C-shaped, flexible metallic reinforcement band confined in said elastomeric split ring.

8. The combination of claim 1 wherein said bore portion is axially tapered to engage said surface which defines a frusto-conical land.

9. The combination of claim 8 including said pipe or rod end having said land which is radially compressively engaged by said skirt bore portion.

10. The combination of claim 9 wherein the rod or pipe end has two-step threading thereon, the ring and skirt extending about said threading.

11. The combination of claim 10 wherein said threading is on the pipe exterior and is protectively encompassed by said ring and skirt, said land located between said threading and the end of the pipe.

12. The combination of claim 10 wherein said threading is on the pipe interior.

13. The combination of claim 9 wherein the ring also compressively engages the pipe or rod exterior surface at a location axially spaced from said skirt.

14. The combination of claim 1 including an annular interior surface defined by said structure which is located to compressively engage a land on the pipe or rod end portion to provide a seal proximate the end of said portion.

15. The combination of claim 14 including said pipe end which has internal threading, the skirt compressively engaging cylindrical outer surface extent of the pipe.

* * * * *